United States Patent
Alasti et al.

(10) Patent No.: US 12,490,058 B2
(45) Date of Patent: Dec. 2, 2025

(54) LOCATION TRACKING FOLLOWING EMERGENCY CALL HANDOFFS

(71) Applicant: DISH Wireless L.L.C., Littleton, CO (US)

(72) Inventors: Mehdi Alasti, Reston, VA (US); Kate Megan Carney Landow, Denver, CO (US); William Charles Beckwith, Washington, DC (US)

(73) Assignee: DISH Wireless L.L.C., Littleton, CO (US)

( * ) Notice: Subject to any disclaimer, the term of this patent is extended or adjusted under 35 U.S.C. 154(b) by 336 days.

(21) Appl. No.: 18/349,786

(22) Filed: Jul. 10, 2023

(65) Prior Publication Data

US 2024/0022875 A1      Jan. 18, 2024

Related U.S. Application Data

(60) Provisional application No. 63/388,494, filed on Jul. 12, 2022.

(51) Int. Cl.
*H04W 4/029* (2018.01)
*H04W 4/90* (2018.01)
*H04W 36/14* (2009.01)
*H04W 80/10* (2009.01)

(52) U.S. Cl.
CPC .............. *H04W 4/029* (2018.02); *H04W 4/90* (2018.02); *H04W 36/142* (2023.05); *H04W 80/10* (2013.01)

(58) Field of Classification Search
CPC ......... H04W 4/90; H04W 76/50; H04W 4/02; H04W 4/029; H04W 88/06; H04W 4/025; H04W 64/00; H04L 65/1069; H04L 65/1016; H04L 65/1104; H04L 65/1095; H04L 67/52; H04M 3/5116; H04M 2242/04; H04M 7/006; H04M 1/72418; H04M 1/2535; G01S 2205/06
See application file for complete search history.

(56) References Cited

U.S. PATENT DOCUMENTS

6,996,087 B2 *  2/2006  Ejzak ...................... H04L 51/58
                                                                370/338
9,788,181 B2 * 10/2017  Edge ................. H04M 1/72418
(Continued)

*Primary Examiner* — Anthony S Addy
(74) *Attorney, Agent, or Firm* — Kilpatrick Townsend & Stockton LLP (57) ABSTRACT

A UE may receive input indicating an attempt to place an emergency call. The UE may communicate with a first cellular network to connect the emergency call. The UE may generate a first SIP header, the SIP header including first location data indicating a first location of the UE. The UE may transmit the SIP header including the first location data via a user plane function of the first cellular network. While the emergency call is ongoing, the UE may disconnect from the first cellular network and connect to a second cellular network. The UE may communicate with the second cellular network to continue the emergency call. The UE may then generate a second SIP header including second location data indicating a second location of the UE. The UE may transmit the second SIP header including the second location data via the user plane function of the first cellular network.

19 Claims, 7 Drawing Sheets

(56) References Cited

U.S. PATENT DOCUMENTS

| | | | | |
|---|---|---|---|---|
| 2007/0149166 A1* | 6/2007 | Turcotte | ............... | H04W 76/50 |
| | | | | 455/404.1 |
| 2010/0284366 A1* | 11/2010 | Zhu | .................. | H04W 36/0033 |
| | | | | 370/331 |
| 2017/0223515 A1* | 8/2017 | Mutikainen | ..... | H04W 36/00226 |
| 2017/0289883 A1* | 10/2017 | Kiss | ..................... | H04W 76/12 |
| 2022/0361133 A1* | 11/2022 | Shaheen | ................. | H04W 8/20 |

* cited by examiner

LOCATION TRACKING FOLLOWING EMERGENCY CALL HANDOFFS

CROSS REFERENCE TO RELATED APPLICATIONS

This application claims priority to U.S. Provisional Patent Application No. 63/388,494, filed on Jul. 12, 2022, the disclosure of which is incorporated by reference in its entirety for all purposes.

BACKGROUND

This disclosure relates to mobile wireless communications. Specifically, this disclosure relates to routing high-priority mobile communications across wireless networks managed by different network providers and providing continuity of location services for the same.

BRIEF SUMMARY

In an embodiment, a method may include receiving, by a user equipment (UE), input indicating an attempt to place an emergency call. The method may include communicating, by the UE, with a first cellular network to connect the emergency call. The method may then include generating, by the UE, a first session initiation protocol (SIP) header, the SIP header including first location data indicating a first location of the UE. The method may also include transmitting, by the UE, the SIP header including the first location data via a user plane function of the first cellular network. While the emergency call is ongoing, the method may include disconnecting, by the UE, from the first cellular network and connecting to a second cellular network. The method may also include communicating, by the UE, with the second cellular network to continue the emergency call. The method may include generating, by the UE, a second SIP header including second location data indicating a second location of the UE. The method may include transmitting, by the UE, the second SIP header including the second location data via the user plane function of the first cellular network through the second cellular network.

In some embodiments, the method may include reconfiguring, by the UE, the UE to generate and transmit the first SIP header including the first location data in response to emergency calls. The reconfiguring may further include determining, by the UE, that the UE is originally configured to provide the first and second location data using control plane functions. Based upon determining that the UE is configured to provide the first and second location data using control plane functions the reconfiguring may include accessing reconfiguration instructions and executing, by the UE, the reconfiguration instructions.

In some embodiments, the first cellular network is associated with a first provider, and the second cellular network is associated with a second provider. The UE may be configured to transmit location data via a control plane function and to transmit the first and second SIP headers via the user plane function. The first location data and the second location data may be provided in a presence information data format location object (PIDF-LO) header. The first cellular network may include a 5G network and the second cellular network may include at least one of a 4G/LTE network and a 3G/2G network. The first cellular network may include a first 5G network and the second cellular network may include a second 5G network. The method may include: determining, by the UE, the first and second location data by at least one of GPS services, provider location services, and triangulation techniques.

In an embodiment, a user equipment (UE) may include one or more processors. The UE may include a non-transitory computer-readable medium containing instructions. When executed by the one or more processors, the instructions may cause the UE to perform operations. According to the operations, the UE may receive input indicating an attempt to place an emergency call. The UE may communicate with a first cellular network to connect the emergency call. The UE may generate a first session initiation protocol (SIP) header, the SIP header including first location data indicating a first location of the UE. The UE may transmit the SIP header including the first location data via a user plane function of the first cellular network. While the emergency call is ongoing, the UE may disconnect from the first cellular network and connect to a second cellular network. The UE may communicate with the second cellular network to continue the emergency call. The UE may then generate a second SIP header including second location data indicating a second location of the UE. The UE may transmit the second SIP header including the second location data via the user plane function of the first cellular network through the second cellular network.

The UE where the UE may include one or more radios configured to communicate via a 5G network. The first cellular network may include a Wi-Fi network and the second cellular network may include at least one of a 5G network, a 4G/LTE network and a 3G/2G network. The SIP header may include an SIP update. The UE may be configured to transmit the location data via a control plane function and the first and second SIP headers are transmitted via the user plane function. In response to the input corresponding to the emergency call, the UE may generate a SIP header at a regular interval. The first cellular network may be associated with a first provider, and the second cellular network is associated with a second provider. The UE is configured to support positioning methods may include mobile-originated location Requests, assisted GPS, enhanced cell id, WiFi round-trip time (WiFi-RTT), downlink time difference of arrival (DL-TDOA), uplink time difference of arrival (UL-TDOA), angle of arrival, and angle of departure. The first location data may include in a p-access-network-info (PANI) header, and the first SIP header may include the PANI header. The first location data may be included in a presence information data format location object (PIDF-LO) header.

DETAILED DESCRIPTION 5G cellular networks utilize various data planes in which various services are provided to and/or for user equipment (UE). For example, a user plane function (UPF) processes data associated with the UE and/or a network provider. The UPF enables connections between the UE and other entities via internet protocol (IP) and other protocols. Control plane functions may process data that allow the UE to communicate to and through the 5G network. For example, an access and mobility management function (AMF) may process control plane data to provide location management and connection maintenance as the UE is handed off from one network (or antenna) to another. A session management function (SMF) may process control plane data to enable the UE to establish, modify, and release sessions, communicating through the AMF with the UE. During communications, functions that process user plane data and control plane data may be active, working in concert to provide various services to the UE.

While connected to a first cellular network, the UE communicates with the UPF and various control plane functions associated with the first cellular network provider (and the first cellular network) to perform various tasks (e.g., communications, location services, etc.). If the UE moves from the particular network to a second cellular network associated with a second cellular network provider, a hand-off occurs, where some or all of the services are taken over by the second network provider. Control plane functions, such as the AMF and SMF, may be provided by the second network provider. The connection between the UE and the control plane-related functions of the first network provider may therefore be severed. User data associated with the UE may continue to be routed to the UPF of the first cellular network provider, especially if a communication is ongoing during the handoff. In many types of communications, the transition from one set of control plane functions to another may not present problems. During emergency communications, however, the transition between sets of control plane functions may cause important data to fail to be provided to the first cellular network.

Mobile devices communicating emergency communications may be required to provide location data so that emergency personnel can be directed to the appropriate location quickly. An emergency communication may be answered by a public safety answering point (PSAP) such as an emergency operator or other such service. The PSAP may request location data from the mobile device during the emergency communication. The request may go through the control plane of a first cellular network, with the request coming through an AMF associated with the network the emergency communication was placed on. The AMF can then request location data from the UE. In response, the UE may transmit the location data in a message or header such as a P-Access-Network-Info (PANI) header and/or a presence information data format location object (PIDF-LO) header via a user plane function of the first cellular network. Alternatively, the UE may communicate its location via a location management function (LMF) via a control plane function. If the UE remains in the same network used to initiate the emergency communication, the location data may be provided without issue. However, if connection to control plane functions of the first cellular network is severed, the request may not reach the UE. Likewise, the UE may not be able to transmit the location data to the appropriate recipient via control plane functions due to a lack of connectivity with the LMF of the first cellular network. Without location data, the PSAP may effectively lose the UE (and the user making the emergency communication). This may lead to unnecessary delay or worse for the user. Therefore, techniques to provide location data to a PSAP when a UE moves from one set of control plane functions to another during an emergency communication may lead to greater safety of the user and lower response times for emergency personnel.

One solution may be to provide the location data in an alternate way, such that the UE still provides location data to the PSAP (or other emergency routing service) even when control plane functions are handled by the second cellular network. For example, the UE may initiate an emergency communication using a voice over IP protocol, such as Voice over New Radio (VoNR) and/or voice over WiFi (VoWiFi), via an IP Multimedia Subsystem service (IMS). Because IMS is IP-based, some or all of the data associated with the emergency communication may be handled by the UPF of the 5G network. To initiate a session through which the data is transferred, UE may generate a Session Initiation Protocol (SIP) header addressed to an emergency routing service and/or a PSAP. The SIP header is (necessarily) also IP-based, and therefore transmitted via the UPF. The UE may modify a traditional SIP header (e.g., an SIP update) to include location data such as the PIDF-LO and/or PANI headers. If the UE moves to a second cellular network and loses control plane connectivity needed to send its location to the first cellular network, the SIP header including the location data may still be routed through the user plane to the emergency routing service. The UE may be configured to generate an SIP header on a regular interval (e.g., every 30 seconds) during an emergency communication. Additionally or alternatively, the UE may begin to generate and transmit the SIP headers with location data in response to joining the second cellular network. The emergency routing service may therefore have a location of the UE with a maximum error window corresponding to the regular interval. When the PSAP requests the location data of the UE, the emergency routing service may provide the location data included in the latest SIP header. In other words, instead of the PSAP pulling the location data from the UE, the UE pushes the location data to the emergency routing service, which then provides the location data to the PSAP upon request.

Figure 1:
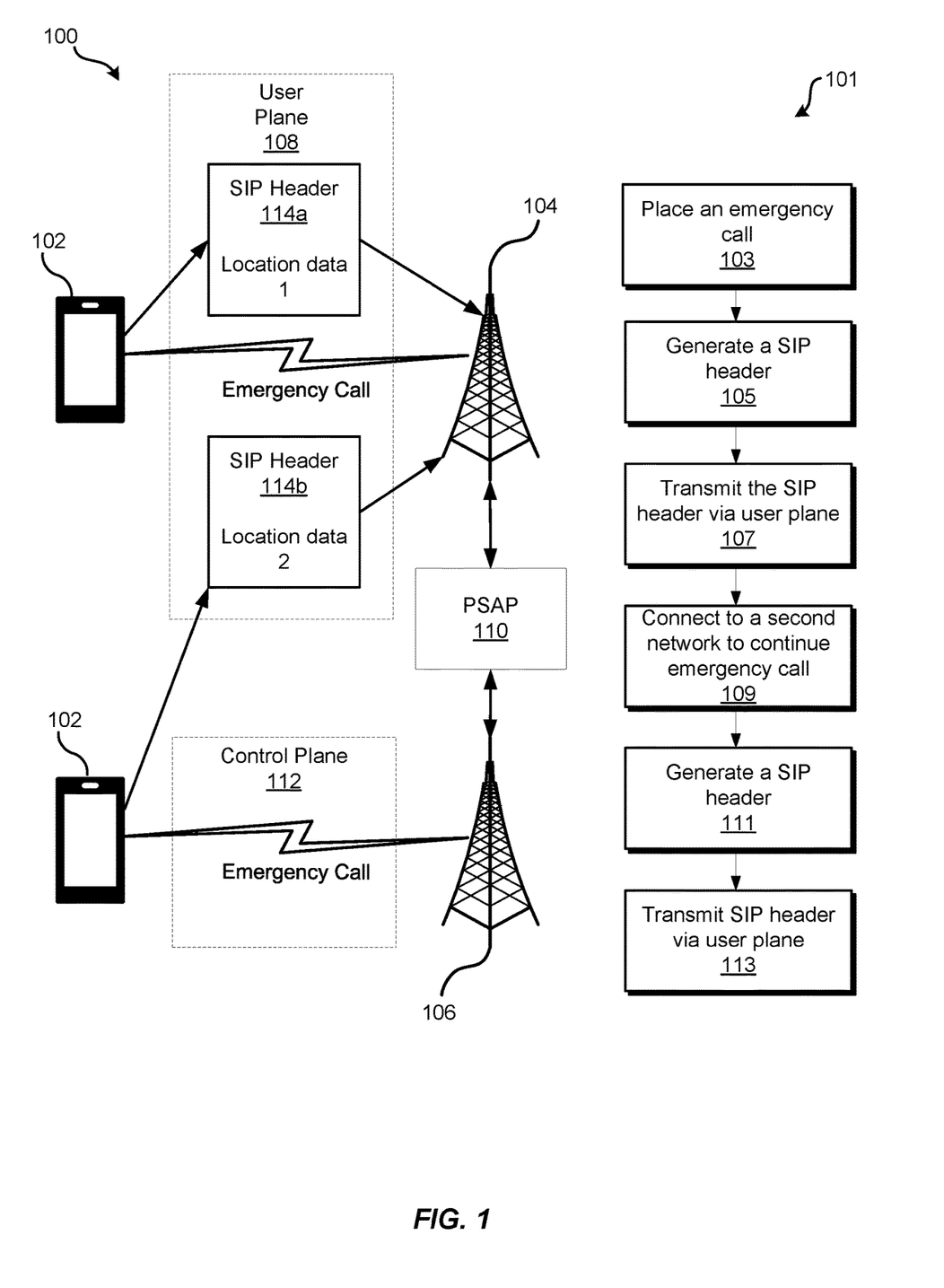
FIG. 1 illustrates a system and a process for providing location information during an emergency communication, according to certain embodiments.

FIG. 1 illustrates a system 100 and a process 101 for providing location information during an emergency communication. The system 100 may include a user equipment (UE) 102, a cellular network first cellular network 104, a second cellular network 106, a user plane 108, a PSAP 110, and a control plane 112. The UE may be a 5G-capable device, such as a mobile phone, cellular-enabled tablet, laptop, or other such device. The UE 102 may be capable of communication via various protocols such as 5G NR, WiFi, 4G LTE, 3G/2G cellular, and other appropriate protocols.

The first and second cellular networks 104 and 106 may include 5G standalone (SA) networks or other cellular networks. In other embodiments, the first cellular network 104 may include a 5G SA network, and the second cellular network 106 may include a 4G network. Both the first and second cellular networks 104 and 106 may include associated control planes, user planes, and functions within each plane that process data to provide various services for one or more UE's. Although the first cellular network 104 and the second cellular network 106 are shown as towers, it should be understood that both the first cellular network 104 and the second cellular network 106 may include some or all of the components described in relation to FIG. 6A. The first cellular network 104 and the second cellular network 106 may also include other hardware and infrastructure necessary to establish a cellular or other communications network. Furthermore, both the first cellular network 104 and the second cellular network 106 may include distributed computing systems, such as a cloud-based computing system, to perform one or more of the functions described herein.

The PSAP 110 may be associated with an emergency operator service or other appropriate recipient. The PSAP 110 may be able to direct one or more emergency services to a location of the UE 102 based on information provided either by a caller, and/or location data provided by the UE 102. In some embodiments, the PSAP 110 may be associated with the first cellular network 104 and/or the second cellular network 106. Additionally, or alternatively, the PSAP 110 may be associated with a geographic area (e.g., a city, country, or other such region). If the first cellular network 104 and the second cellular network 106 are in different regions, the PSAP 110 may not be associated with one or the other of the first and second cellular networks 104 and 106. An emergency communication initiated through the first cellular network 104 may be connected to the PSAP 110, while another emergency communication initiated through the second cellular network 106 may be connected to another PSAP. Similarly, location data may be provided to either the PSAP 110 or the other PSAP, depending on which cellular network handled the emergency communication. If the emergency communication is made through the first cellular network 104 by the UE 102 and continued by the second cellular network 106 (e.g., because the UE 102 physically moved out of range of the first cellular network 104), some or all of the call data, location data, or other data may not be properly routed to the PSAP 110.

In an example, the UE 102 may be configured to provide location data via control plane functions of a cellular network (e.g., the first cellular network 104). If the UE 102 places an emergency communication on the first cellular network 104, the UE 102 may provide location data through various control plane functions (e.g., an AMF, an LMF, a GMLC, etc.) upon request from the PSAP 110. However, if the UE 102 moves from the first cellular network 104 to the second cellular network 106 during the emergency communication, control plane functions associated with the second cellular network 106 may process data via the control plane 112 and the connection with the first control plane functions may be severed. The process 101 may enable the UE 102 to provide location data to the PSAP 110 after control plane functions are handed off to the control plane 112 during the emergency communication.

At step 103 of the process 101, the UE 102 may place an emergency communication via the first cellular network 104. The emergency communication may be a 911 call or such call for emergency services. The emergency communication may be routed through an emergency routing service associated with the first cellular network 104. The emergency routing service may be part of the first cellular network 104 and/or a third party. In either case, the emergency routing service may access location data via the control plane functions of the first cellular network 104. The emergency routing service may route communication and/or location data to the PSAP 110. Furthermore, the UE 102 may be originally configured to only transmit the location data via the control plane functions. The UE 102 may be reconfigured to additionally or alternatively transmit location data by other methods.

At step 105 of the process 101, the UE 102 may generate an SIP header 114a including location data 1. The SIP header may be an SIP invite (to initiate a session), an SIP update, and/or an SIP options header. The location data 1 may be included in a PIDF-LO and/or PANI header, included in the SIP header 114a. At step 107, the SIP header 114a may be transmitted via the user plane 108 (e.g., by the UPF). The SIP header 114a and/or location data 1 may be forwarded to the emergency routing service and held until requested by the PSAP 110. Additionally or alternatively, the SIP header 114a and/or the location data 1 may be pushed directly to the PSAP 110.

At step 109, the UE 102 may disconnect from the first cellular network 104 and connect to the second cellular network 106. This handoff between the first cellular network 104 and the second cellular network 106 may occur because the UE 102 left a network coverage area associated with the first cellular network 104 and entered a network coverage area associated with the second cellular network 106. In other examples, the handoff may occur because of a network outage of the first cellular network 104. In either case, the second cellular network 106 may enable the emergency communication to continue between the UE 102 and the PSAP 110. However, because the UE 102 is now connected to the second cellular network 106, control plane functions may now be handled via the control plane 112 instead of the control plane functions associated with the first cellular network 104. Therefore, if the PSAP 110 requests updated location data from the UE 102 via the control plane functions associated with the first cellular network 104, the UE 102 may not receive the request. Furthermore, the UE 102 may not provide the updated location data via the control plane function associated with the first cellular network 104 because control plane functions are now handled by the control plane 112.

At step 111, the UE 102 may generate an SIP header 114b including location data 2. The location data 2 may be associated with an updated location of the UE 102. The location data 2 may be included in a PIDF-LO and/or PANI header. The UE 102 may generate the SIP header 114b in response to detecting the handoff from the first cellular network 104 to the second cellular network 106. In some embodiments, the UE 102 may generate the SIP header 114b and subsequent SIP headers at regular intervals (e.g., every 10 seconds, 30 seconds, etc.). Additionally or alternatively, the UE 102 may be configured to begin generating and transmitting SIP headers in response to connecting to the second cellular network. At step 113, the UE 102 may transmit the SIP header 114b to the PSAP 110 (and/or the emergency routing service) via user plane functions of the user plane 108 associated with the first cellular network 104. The SIP header 114b and/or location data 2 may be stored by the PSAP 110 and/or the emergency routing service until updated location data is received. For example, an SIP header with location data may be generated by the UE every 30 seconds. Then, the location data may be stored by the emergency routing service and/or the PSAP 110 until the next SIP header is transmitted. Thus, the location data may represent the location of the UE 102 with no more than a 30 second error window. In other words, by pushing the location data in an SIP header via the user plane 108, the UE 102 may provide an accurate location to the PSAP 110, even if control plane functions between the PSAP 110 and the UE 102 are severed.

Figure 2:
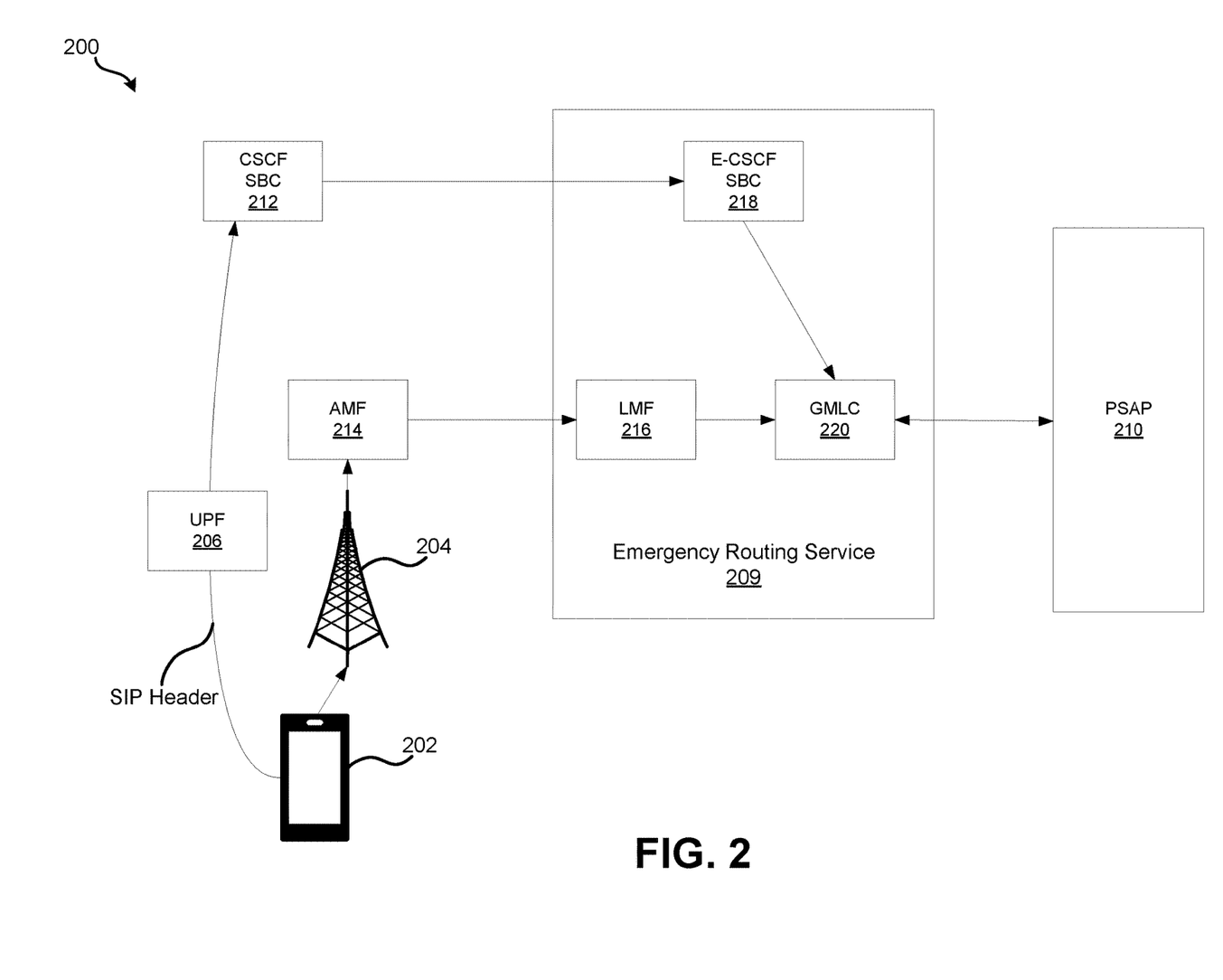
FIG. 2 illustrates a block diagram of a system for providing location data during an emergency communication, according to certain embodiments.

FIG. 2 illustrates a block diagram of a system 200 for providing location data during an emergency communication, according to certain embodiments. The system 200 may be similar to the system 100 in FIG. 1. The system 200 may include a UE 202, a 5G network 204 with a UPF 206, an emergency routing service 209, and a PSAP 210. The UE 202 may be originally configured to only provide location data via control plane functions. The UE 202 may then be modified to provide location data via the UPF 206 (e.g., in a PIDF-LO header). The UPF 206 may route user data (e.g., call data, SIP headers, etc.) to a call session control function session border control (CSCF SBC) 212 (sometimes "SBC 212") of the 5G network 204. The 5G network 204 may also include an AMF 214 that processes control plane data. The AMF 214 may provide control plane data (e.g., location data) to a location management function (LMF) 216. The LMF 216 may be associated with the emergency routing service 209. The emergency routing service 209 may also include an emergency communication session control function session border control (E-CSCF SBC) 218 (sometimes SBC "218") and a gateway mobile location center (GMLC) 220. The SBC 212 may be a data-entry point into the IMS domain for VoNR services. The SBC 212 may also serve as an outbound proxy server for the UE 102. During emergency communications, the SBC 212 may transmit the SIP header (e.g., SIP invite, SIP options, SIP update, etc.) to the SBC 218 of the emergency routing service 209.

The AMF 214 may establish an emergency communication connection between the UE 102 and/or the emergency routing service 209. The AMF 214 may also provide an indication to the emergency routing service 209 regarding the call status (e.g., Call Origination, Call Termination, Handover, etc.). The AMF 214 may also initiate location procedures with the LMF 216 when requested by the GMLC 220. As such, the AMF 214 may provide location data from the UE 202 to the LMF 216. Other control plane functions may also provide location data to the emergency routing service 209. The LMF 216 may then process location service requests made by the GMLC 220 and/or the PSAP 210. In turn, the LMF 216 may update the GMLC 220. The GMLC 220 may serve as a gateway between the UE 202 and the PSAP 110, holding location data until requested by the PSAP 210. The GMLC 220 may request the location data in response to a request from the PSAP 210 or generate the request on its own.

The UE 202 may initiate an emergency communication through the 5G network 204. To begin a voice session, the UE 202 may generate an SIP header and transmit the SIP header through the SBC 212 via the UPF 206. The SIP header may include location information. The SIP header may also include an address or other identifier that directs the SIP header and/or emergency communication to the emergency routing service 209. The emergency communication may then be connected to the PSAP 210 either directly through the 5G network 204 or via the emergency routing service 209. Upon the initiation of the emergency communication, the AMF 214 (and other control plane functions) process control plane data and provide the control plane data to the emergency routing service 209 and/or the PSAP 210. The emergency connection may be flagged such that any communications made within the emergency connection are given high priority on any network used.

Once the emergency communication is connected, the PSAP 210 may request the location of the UE 202 from the emergency routing service 209. The request may be received by the GMLC 220. The GMLC 220 may then request location data for the UE from the LMF 216 and/or the AMF 214. The AMF 214 may then initiate location procedures with the UE 202. The location procedures may include determining a location of the UE 202. The UE 202 may utilize GPS services, provider location services, cell-tower triangulation, one or more sensors included in the UE 202 (e.g., an accelerometer, a barometer, radio unit identifiers, etc.), and/or any other suitable services to determine its location. The UE 202 may include components necessary to support positioning methods such as mobile-originated location requests, assisted GPS (A-GPS) methods, enhanced cell ID (E-CID) methods, WiFi round-trip time (WiFi-RTT), downlink time difference of arrival (DL-TDOA), uplink time difference of arrival (UL-TDOA), angle of arrival, angle of departure and observed time difference of arrival (OTDOA) methods or other 5G NR positioning methods.

The UE 202 may then provide the location data via the AMF 214 and LMF 216. The GMLC 220 may then provide the location data to the PSAP 210, fulfilling the request. This process may continue as long as the UE 202 is connected to the control plane 208. However, if the UE 202 moves outside of the coverage area of the 5G network 204, the UE 202 may no longer communicate via the control plane 208.

In that case, UE 202 may include the location data (e.g., in a PIDF-LO header and/or PANI header) in the SIP header and transmit the SIP header via the UPF 206 and the SBC 212. The SIP header may thus be properly routed to the emergency routing service 209 even if the UE 202 is no longer connected to the control plane functions of the 5G network 204 (e.g., the AMF 214). The SIP header may be received by the SBC 218 of the emergency routing service 209. The SBC 218 may forward the location data included in the SIP header to the GMLC 220. The GMLC 220 may store the location data at least until another SIP header is received from the UE 202. In some embodiments, the UE 202 may generate an SIP header with location data at regular intervals during an emergency communication (e.g., every 10 seconds, 30 seconds, etc.). Thus, the GMLC 220 may include location data no older than the length of an interval.

In some embodiments, a UE such as the UE 202 may be configured to transmit location data via the UPF 206 by default. Therefore, connecting to a different network (and therefore a different control plane) may have no effect on the UE providing location data to the emergency routing service 209. In other embodiments, the UE 202 may be originally configured to provide location data via the control plane functions. A cellular network provider associated with the UE 202 and/or the 5G network 204 may then determine that the UE 202 is configured to provide location data via control plane functions. In response, the UE 202 may access instructions that, when executed by one or more processors of the UE 202, cause the UE 202 to be reconfigured. After the reconfiguration, the UE 202 may generate SIP headers with location information and transmit the SIP headers at regular intervals during an emergency communication. In some embodiments, the UE 202 may only begin to generate the SIP headers with location information in response to connecting to a second network. The instructions may be provided by a manufacturer of the UE 202 and/or the cellular network provider.

Figure 3:
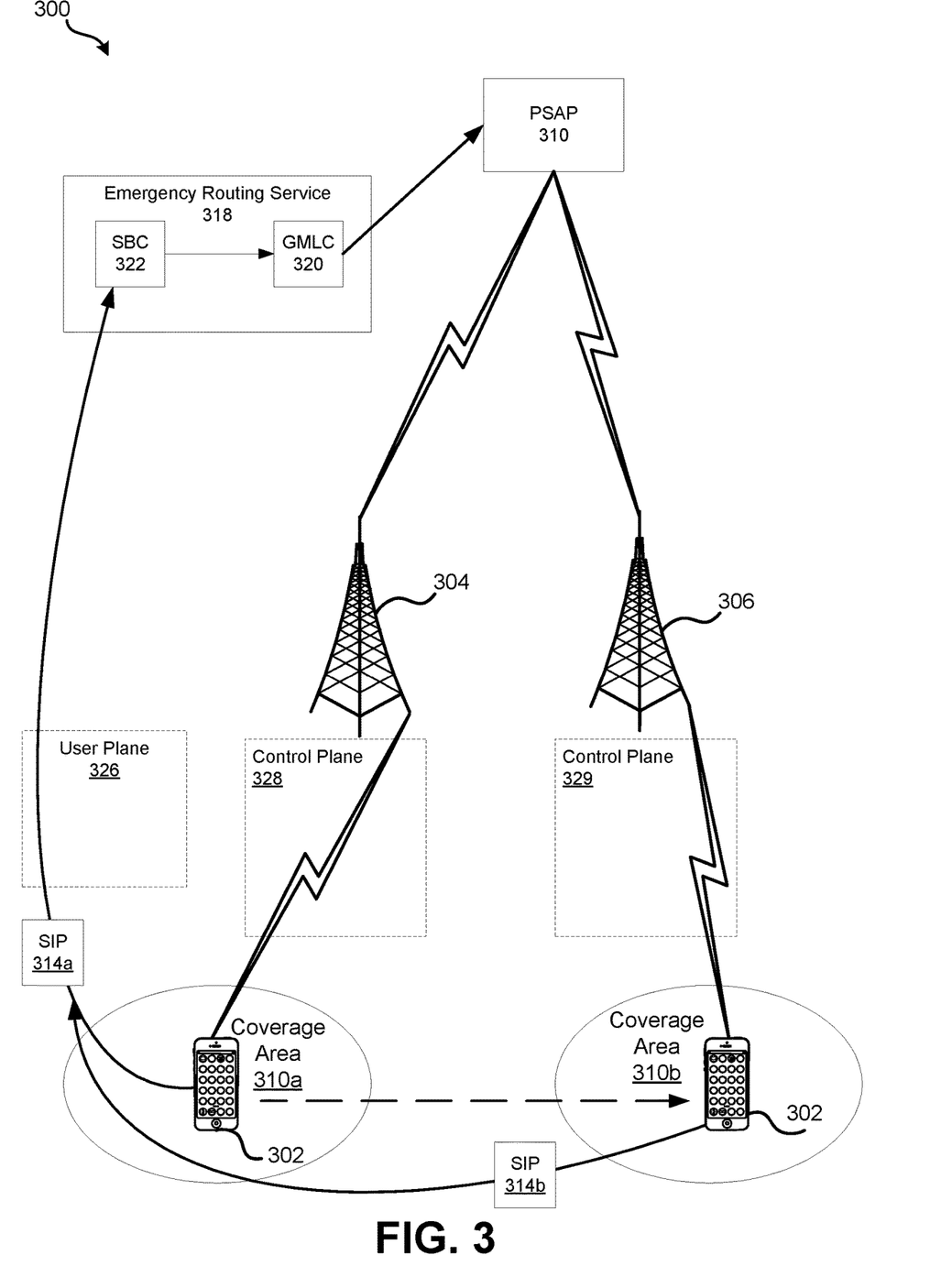
FIG. 3 illustrates a system for providing location data during an emergency communication while changing networks, according to certain embodiments.

FIG. 3 illustrates a system 300 for providing location data during an emergency communication while changing networks, according to certain embodiments. The system 300 may include a UE 302, a home cellular network 304, and a visiting cellular network 306. The system 300 may also include an emergency routing service 318 and a PSAP 330. The home cellular network 304 may be operated by a first network provider. The home cellular network 304 may be similar to the home cellular network 304 in FIG. 1 and include similar features and capabilities. The home cellular network 304 may also provide a first coverage area 310a. The visited cellular network 306 may be operated by a second network provider that is associated with a second cellular network. The visited cellular network 306 may provide a second coverage area 130b. The first and/or second network provider may be a cellular network provider, internet telephony service provider (ITSP), or other such network provider.

The home cellular network 304 and the visited cellular network 306 may include cellular towers, configured to provide a cellular network (e.g., a 5G network similar to the 5G network 204 in FIG. 2) providing VoNR or other cellular services over a given area. Additionally or alternatively, one or both of the home cellular network 304 and the visited cellular network 306 may include a router, providing internet or other such connectivity to a given area. For example, the home cellular network 304 may include a router, providing internet to a specific building. The first coverage area 310a may then correlate to an apartment or a house. In some embodiments, the first coverage area 310a may provide voice-over-WiFi (VoWiFi) services to the UE 302. Mobile communications may be initiated by the UE 302 and sent via internet protocol (IP) through the home cellular network 304.

The home cellular network 304 and the visited cellular network 306 may comprise networks such as a 5G New Radio (NR) cellular network, a hybrid 4G/5G network, a 4G network, or other types of cellular networks. In some embodiments, the home cellular network 304 and the visited cellular network 306 may comprise identical networks. In other embodiments, the home cellular network 304 and the visited cellular network 306 may include different networks provided by different cellular network providers. Although the home cellular network 304 and the visited cellular network 306 are shown as towers, it should be understood that both the home cellular network 304 and the visited cellular network 306 may include a network of towers (and/or other antennas) and/or one or more computing devices capable of executing computer readable instructions. The home cellular network 304 and the visited cellular network 306 may also include other hardware and infrastructure necessary to establish a cellular or other communications network. Furthermore, both the home cellular network 304 and the visited cellular network 306 may include distributed computing systems, such as a cloud-based computing system, to perform one or more of the functions described herein.

Both the home cellular network 304 and the visited cellular network 306 may also provide location services such as 4G mobility management entity (MME), 5G core access and mobility management function (AMF), or other suitable location functions via control plane functions. The control plane functions may also enable the UE 302 to connect and communicate to the home cellular network 304 and the visited cellular network 306. Control data, used by control plane functions of the home cellular network 304 or visited cellular network 306 may be carried on control plane 328 or a control plane 329, respectively. In other words, control plane functions are provided in the control plane associated with whichever cellular network the UE 302 is connected to. By contrast, user data associated with the UE 302 may be routed through a user plane 226 no matter which cellular network the UE 302 is connected to.

Additionally, the home cellular network 304 may be associated with the emergency routing service 318. In some embodiments, the home cellular network 304 may include the emergency routing service 318. In other embodiments, the home cellular network 308 may utilize the emergency routing service 318 to provide some or all of the services associated with emergency communications. The emergency routing service 318 may be similar to the emergency routing service 209 in FIG. 2. As such, the SBC 322 may be similar to the SBC 218, and the GMLC 320 may be similar to the GMLC 220. The GMLC 220 may be responsible for providing of location data regarding the UE 302, including sending positioning and location requests to and from the PSAP 310 and/or UE 302.

As described in FIG. 2, the PSAP 310 may request the location data regarding the UE 302 from the GMLC 320 of the emergency routing service during an emergency communication. The emergency routing service 318 may be able to request the location data from the UE 302 via control plane functions on the control plane 328 of the home cellular network 304 as long as the UE 302 is connected to the home cellular network 304. Accordingly, the UE 302 may be able to provide the location data to the emergency routing service 318 via control plane functions of the control plane 328.

In an embodiment, the UE 302 may initiate an emergency communication, such as a 9-1-1 call, from the first coverage area 310a. In the case that the first network provider is an ITSP, the emergency communication may be based on the Session Initiation Protocol (SIP). In response to initiating the mobile communication, the UE 302 may generate an SIP header 314a (e.g., an SIP invite, an SIP options, an SIP update, etc.). The SIP header 314a may include a flag that denotes the mobile communication as an emergency communication. The SIP header 314a may also include location data, such as a PIDF-LO header and/or a PANI header. In response to the emergency communication, the UE 302 may generate SIP headers and transmit the SIP headers to the emergency routing service 318 via a user plane 326 associated with the home cellular network 304 and/or the UE 302 at regular intervals. In some embodiments, the UE may adjust the interval based upon a change in distance between two consecutive reported locations.

After initiating the emergency communication, the UE 302 may transmit the emergency communication and the SIP header 314a via the user plane 326 to the emergency routing service 318. The user plane 326 may include user plane functions such as the UPF 206 and the SBC 212 in FIG. 2. The SBC may provide data such as location data to the emergency routing service 318. The home cellular network 304 (including one or more computing devices associated with the home cellular network's 304 network provider) may route the emergency communication to the PSAP 310 at least in part via control plane functions on the control plane 328. The home cellular network 308 may also initiate location services via the control plane 328 using MME, AMF, or other suitable location protocols.

After initiating the emergency communication, the UE 302 may leave the first coverage area 310a and enter the second coverage area 310b. In other words, the UE 302 may have been handed off by the home cellular network 304 to the visited cellular network 306 (a "cellular network handover"). The UE 302 may have been moved physically out of the first coverage area 310a. In some embodiments, the coverage areas 310a-b may overlap. Alternatively, the home cellular network 304 may experience an outage and, in response, the mobile device may switch to the visited cellular network 306. In any case, because the UE 302 is no longer connected to the home cellular network 304, control plane functions (e.g., AMF, etc.) may no longer be provided via the control plane 328. Instead, after switching to the second coverage area 310b, the UE 302 may continue the emergency communication using the visited cellular network 306. Control plane function may be provided by the visited cellular network 306 via the control plane 329. Because the UE 302 is no longer communicating with the control functions of the home cellular network 308, requests for updated location data from the emergency routing service 318 (and/or the PSAP 310) may not reach the UE 302. Thus, the UE 302 may not be able to provide location data to the emergency routing service 318.

The UE 302 may perform a device-based positioning method to obtain a geographical position in order to provide the updated location data. The UE 302 may utilize GPS services, provider location services, cell-tower triangulation, and/or one or more sensors included in the UE 202 in order to obtain the updated location data. In some embodiments, the UE 302 may already have the updated location data and retrieve the updated location data from a memory. The UE 302 may then transmit an SIP header 314b via user plane functions of the user plane 326 (e.g., a UPF, an SBC, etc.). Because the SIP header 314b is IP-based, the SIP header 314b may be transmitted on the user plane 326 regardless of the control plane functions the UE 302 is connected to.

The SIP header 314b may include the updated location information via a PANI header and/or a PIDF-LO header. In some embodiments, the SIP header 314b may include the updated location information in response to connecting to the visited cellular network 306. The SIP header 314b may be received by the SBC 322 and the updated location data reported to the GMLC 320. Upon request, the GMLC 320 may provide the updated location data and/or geographic location to the PSAP 310. Thus, the PSAP 310 may continue to receive location data associated with the UE 302 after the cellular network handover, even though the emergency routing service 318 is no longer connected to the UE 302 via control plane functions on the control plane 328.

The visited cellular network 306 may determine the UE 302 is transmitting an emergency communication based on the SIP header 314b heading or other information associated with the emergency communication. In response, visited cellular network 306 may elevate a priority level of the emergency communication. The elevated priority level may supersede any other communication being made over the visited cellular network 306. Additionally, the elevated priority level may supersede any rules applied to the UE 302 by the visited cellular network 306 (e.g., blacklisting a device, out-of-network denial, etc.). Thus, the visited cellular network 306 may ensure that the emergency communication continues uninterrupted after the cellular network handover.

In another embodiment, the home cellular network 304, the visited cellular network 306, and other network providers (not shown) may provide a dedicated route for emergency communications. The dedicated route may be created by a joint agreement or through a mandate by a standards-body. In response to determining that the UE 302 is transmitting an emergency communication based on the SIP headers 314a-b or other information associated with the emergency communication, the visited cellular network 306 may transmit the emergency communication on the dedicated route. Other network traffic on the visited cellular network 306 may not be interrupted, as the emergency communication is transmitted along the dedicated route. Thus, the emergency communication may be continued uninterrupted along the dedicated route between the UE 302 and the PSAP 310.

Although the system 300 is described only using the home cellular network 308 and the visited cellular network 309, the emergency communication may be handed off to any number of additional cellular networks. Furthermore, although the example above describes the network provider associated with the home cellular network 308 as an ITSP, and the network provider associated with the visited cellular network 306 as an RAN, any type of network may be used by either cellular network.

Figure 4:
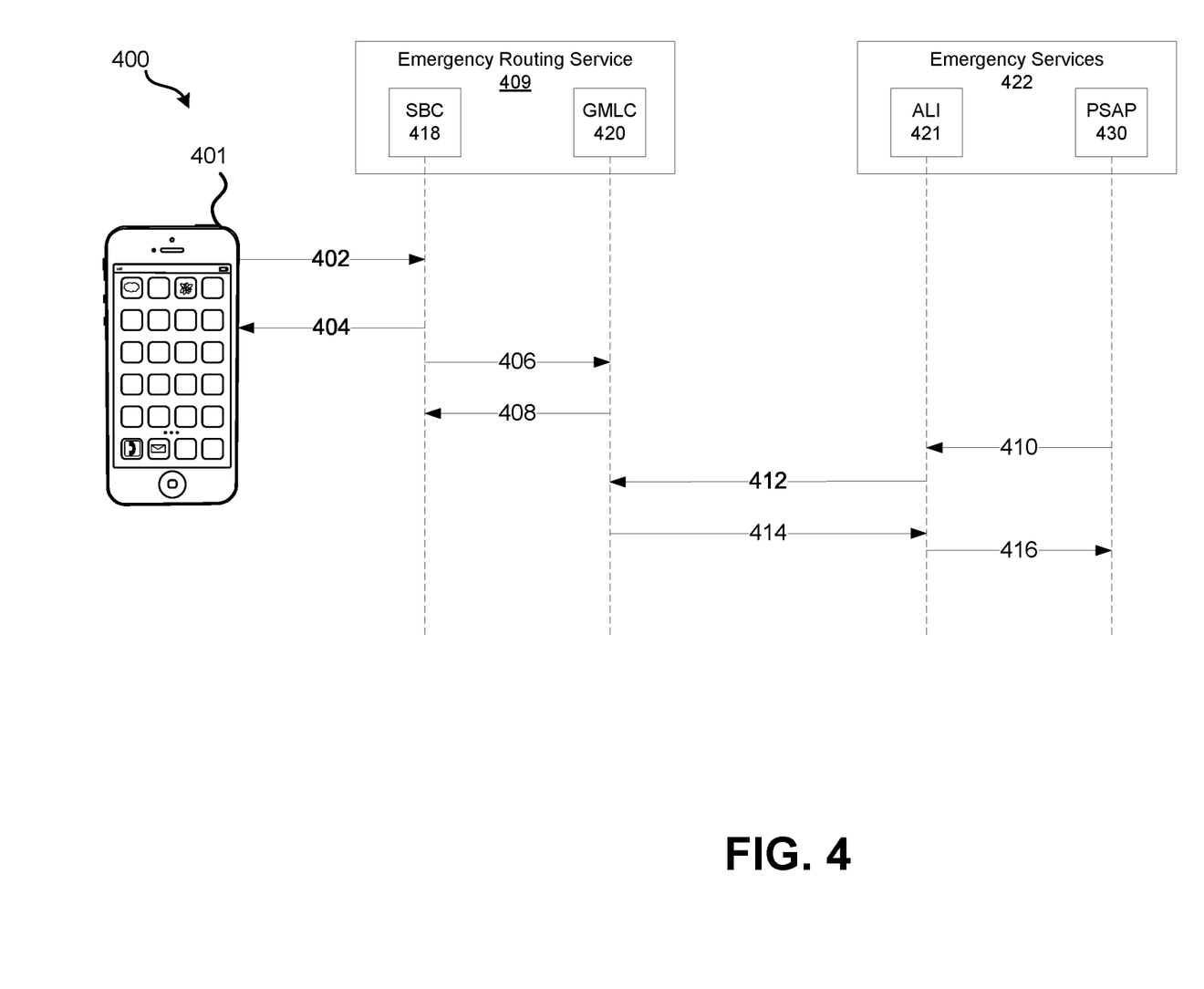
FIG. 4 illustrates a diagram of a process for providing location data to a PSAP during an emergency communication, according to certain embodiments.

FIG. 4 illustrates a diagram of a process 400 for providing location data to a PSAP 430 during an emergency communication, according to certain embodiments. The process 400 may be performed by some or all of the devices described herein. For example, the process 400 may be performed by some or all of the components described in relation to FIGS. 2 and 3. A UE 401 may be similar to the UE 202 in FIG. 2 and include similar functionalities and components. An emergency routing service 409 may be similar to the emergency routing service 209 in FIG. 2. Similarly, the SBC 418 may be similar to the SBC 218 and a GMLC 420 may be similar to the GMLC 220. Emergency services 422 may include an automatic location identification (ALI) 421 and a PSAP 430. The emergency services 422 may be a collection of services that collect information during emergency communications. The PSAP 430 may be similar to the PSAP 310 in FIG. 3 and include a call center, emergency operator, and/or other suitable services. The ALI 421 may be configured to automatically request location data associated with the UE 401 during an emergency communication. The ALI 421 may communicate via a control plane associated with a network provider. For example, the ALI 421 may include a location retrieval function (LRF) or other control plane function and process information received from an AMF (e.g., the AMF 214). The ALI 421 may also provide other information associated with the UE, such as a telephone number and other appropriate information.

At step 402, the UE 401 may transmit an SIP header to the SBC 418 of the emergency routing service 409. The SIP header may be similar to the SIP header 314a in FIG. 3. The SIP header may include an SIP invite, an SIP update, an SIP options message, or other such header. The SIP header may include location data associated with the UE 401. The location data may be included in a PIDF-LO header and/or a PANI header. Because the SIP header is IP-based, the SIP header may be transmitted via a UPF associated with the UE 401 and/or a network provider. At step 404, the SBC 418 may transmit an acknowledgement that the SIP header is received. The acknowledgement may result in a session being established and/or confirmation of any changes made to the session as a result of information included in the SIP header.

At step 406, the SBC 418 may provide some or all of the SIP header to the GMLC 420. For example, the SBC 418 may only provide the location data to the GMLC 420. The GMLC 420 may store the location data. In some embodiments, the GMLC 420 may add the location data to past location data, creating a location history. In other embodiments, the GMLC 420 may overwrite past location data. At step 406, the GMLC 420 may transmit an acknowledgement, stating that the location data has been received.

At step 410, the PSAP 430 may request the location data associated with the UE 401 from the ALI 421. At step 412, the ALI 421 may request the location data from the GMLC 420. The request may be communicated to the GMLC 420 via any suitable network connection. In response to the request, the GMLC 420 may access the location data included in the SIP header. At step 414, the GMLC 420 may provide the location data to the ALI 421. At step 416, the ALI 421 may provide the location data to the PSAP 430.

Although only one cycle of the process 400 is shown, the process 400 may be performed, in whole or in part, any number of times during an emergency communication. For example, the UE 401 may be configured to generate an SIP header with location data at a regular interval during any emergency communication (e.g., every 30 seconds). Then, steps 402 through 408 may be repeated according to the regular interval. The GMLC 420 may then have updated location information provided in the regular interval. Thus, when the PSAP 430 requests the location data through the ALI 421, the location data may be current as of the latest SIP header provided by the UE 401. In other words, the PSAP 430 may be provided with current location data associated with the UE 401 regardless of the control plane functions the UE 401 is using.

Figure 5:
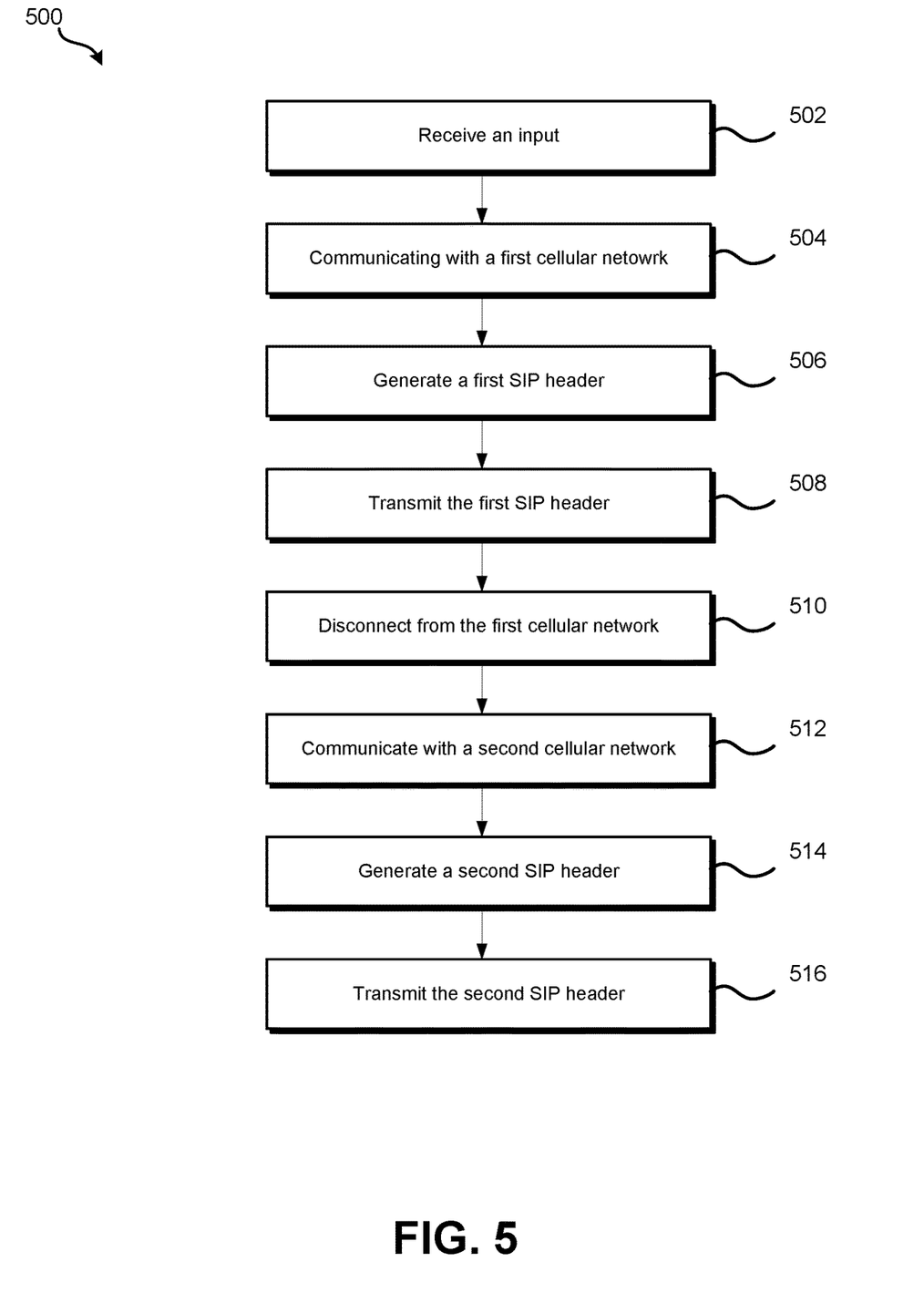
FIG. 5 illustrates a flowchart of a method for providing location data during an emergency call, according to certain embodiments.

FIG. 5 illustrates a flowchart of a method 500 for providing location data during an emergency call, according to certain embodiments. The method 500 may be performed by some or all of the systems and devices described herein. For example, the method 500 may be performed by the system 100 in FIG. 1 and/or the systems 200 and 300 in FIGS. 2 and 3, respectively. In some embodiments, some or all of the steps of the method 500 may be performed in a different order than is described and/or skipped altogether.

The method 500 may be performed by a UE, similar to the UE 202 in FIG. 2. In some embodiments, the UE 202 may be originally configured to transmit location data via control plane functions (e.g., an AMF). Upon determining that the UE is configured to transmit location data via control plane functions, the UE may access reconfiguration instructions. When executed, the reconfiguration instructions may cause the UE to be reconfigured such that location data may also be provided using user plane functions. Then, at step 502, the method 500 may include receiving, by a UE, input indicating an attempt to place an emergency call. The UE may be similar to the UE 202 in FIG. 2. The input may correspond to an icon or other such input indicating an emergency service (e.g., fire, police, medical, etc.). The input may additionally or alternatively include dialing numbers associated with an emergency service (e.g., 911, 112, 999, etc.).

At step 504, the method 500 may include communicating, by the UE, with a first cellular network to connect the emergency call. The first cellular network may be similar to the home cellular network 304 in FIG. 3. The UE may communicate with the first cellular network via 5G voice call technologies (e.g., VoNR), VoWiFi, and/or other VoIP protocols. In some embodiments, the UE may communicate with the first cellular network via 4G LTE, 3G/2G cellular protocols, and/or other appropriate protocols. The communication may be performed, at least in part, using control plane functions associated with the first cellular network. The control plane functions may include an SMF, AMF, and other such control plane functions. In some embodiments, location data may be transmitted by the UE via the control plane functions.

At step 506, the method 500 may include generating, by the UE, a first SIP header including first location data indicating a first location of the UE. The first SIP header may be an SIP invite, an SIP update, an SIP options message, or other appropriate SIP header. The first location of the UE may be determined via provider services, GPS services, or triangulation techniques, and/or by using one or more sensors included in the UE (e.g., an accelerometer, a barometer, etc.). The first location data may be included in a PIDF-LO header and/or a PANI header. In relation to FIG. 3, the first location of the UE may correspond to the coverage area 310a.

At step 508, the method 500 may include transmitting, by the UE, the first SIP header including the first location data via a user plane function of the first cellular network. The user plane function may be a UPF associated with the first cellular network and/or the UE. The first SIP header may be IP-based and therefore routed by the UPF. Because the first location data may be included in the first SIP header, the UE may (in effect) communicate the first location data via both control plane functions and the UPF. The first SIP header and first location data may be provided to an emergency routing service, similar to the emergency routing service 209 in FIG. 2. The emergency routing service may store the first location data at a GMLC (e.g., the GMLC 220) and provide the first location data to a PSAP (e.g., the PSAP 210) upon request.

While the emergency call is ongoing, at step 510, the method 500 may include disconnecting, by the UE, from the first cellular network and connecting to a second cellular network. The second cellular network may be similar to the visited cellular network 306 in FIG. 3. In disconnecting from the first cellular network, control plane functions needed to continue the emergency call may be assumed by control plane functions associated with the second cellular network. Thus, the UE may no longer provide location data via the control plane functions associated with the first cellular network. As described above, the UE may therefore no longer be able to respond to requests for location information (e.g., from the ALI 421, the PSAP 430, and/or the emergency routing service 409 in FIG. 4).

At step 512, the method 500 may include communicating, by the UE, with the second cellular network provider to continue the emergency call. Communicating with the second cellular network provider may be performed via 5G voice call technologies (e.g., VoNR), VoWiFi, and/or other VoIP protocols. In some embodiments, the UE may communicate with the second cellular network via 4G LTE, 3G/2G cellular protocols, and/or other appropriate methods. The emergency call may remain connected to the PSAP and/or the emergency routing service through the second cellular network. Some control plane functions, such as AMF services, between the emergency routing service and the UE may be discontinued, however. Because of the nature of the emergency call, updated location information may still be requested by the PSAP in order to provide emergency services to the user making the emergency call.

At step 514, the method 500 may include generating, by the UE, a second SIP header including second location data indicating a second location of the UE. The second location of the UE may be determined via provider services, or GPS services, triangulation techniques, and/or by using one or more sensors included in the UE (e.g., an accelerometer, a barometer, etc.). The second location may correspond to the second coverage area 310b in FIG. 3. The second location data may be included in a PIDF-LO header and/or PANI header.

At step 516, the method 500 may include transmitting, by the UE, the second SIP header including the second location data via the user plane function associated with the first cellular network through the second cellular network. Because the second SIP header is IP-based, the user plane of the first cellular network may determine routing of the second SIP header. The second SIP header including the second location data may be transmitted to the emergency routing service by the UPF. Thus, the GMLC may receive updated location data associated with the UE via the user plane, even if control plane location services are severed.

In some embodiments, the method 500 may also include configuring the UE to include instructions that cause the UE to generate and transmit the first and second SIP headers in response to the emergency call being placed on the UE. The UE may determine that the UE is originally configured to utilize control plane functions to provide the first and second location data. Based on determining that the UE is configured to utilize the control plane functions to provide the first and second location data, the UE may access reconfiguration instructions. When executed by one or more processors included in the UE, the reconfiguration instructions may cause the UE to be configured to generate and transmit an SIP header with location data at regular intervals (e.g., every 30 seconds). The GMLC may therefore be updated with new location data, such that current location data may be provided to the PSAP upon request. In some embodiments, the UE may be configured to include location data in the SIP headers in response to connecting to a second cellular network during an emergency call.

In some embodiments, the first cellular network may be associated with a first provider, and the second cellular network may be associated with a second provider. An elevated priority level may be assigned to the emergency call. The elevated priority level may supersede any rules applied to the UE by the second cellular network (e.g., blacklisting a device, out-of-network denial, etc.). In some embodiments, the first cellular network may include a 5G network. The second cellular network may include a separate 5G network, a 4G LTE network and/or a 3G/2G network. In other embodiments, the first cellular network may include a WiFi network.

Figure 6A:
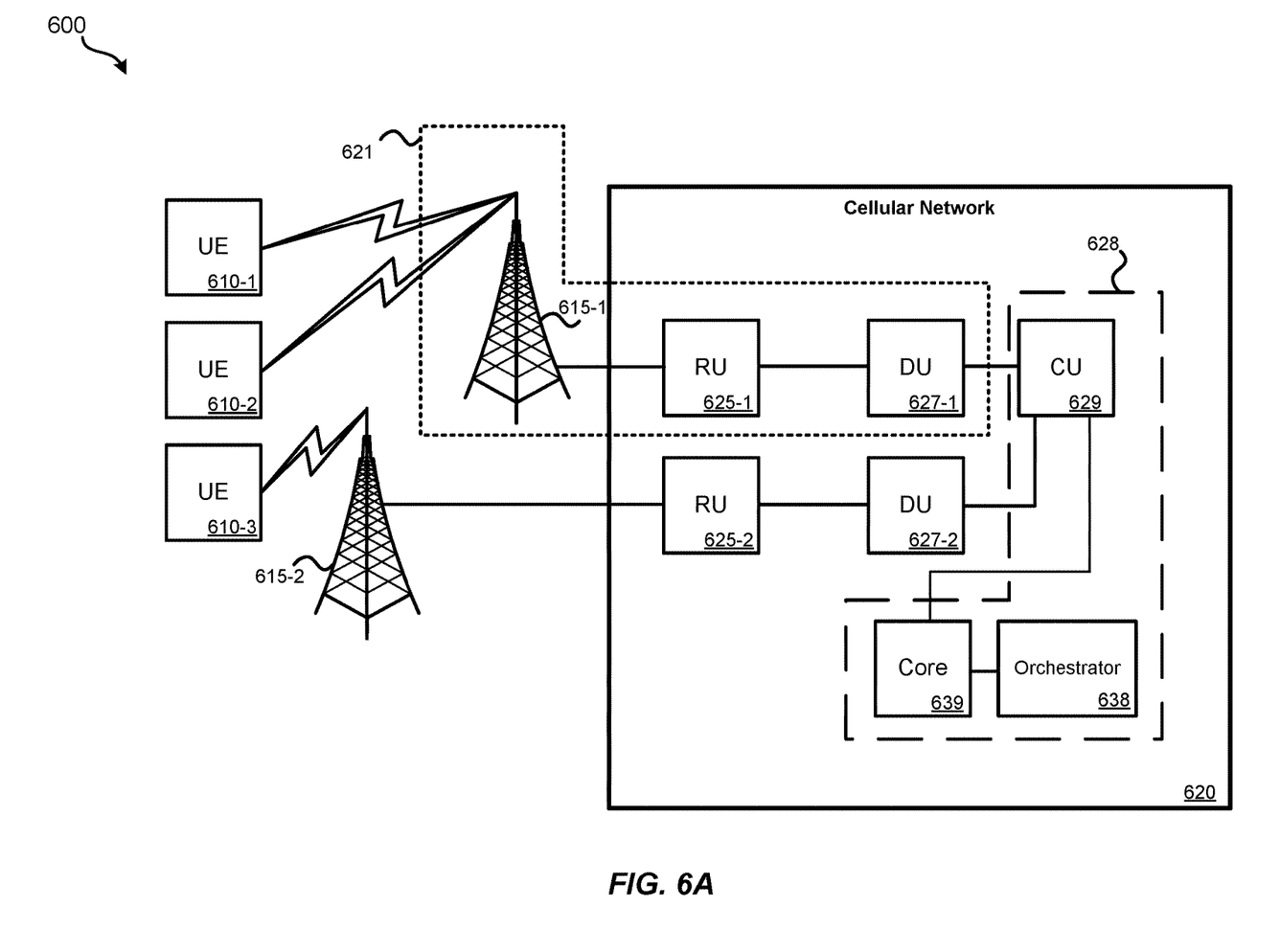
FIG. 6A illustrates an embodiment of a cellular network system, according to certain embodiments.

FIG. 6A illustrates an embodiment of a cellular network system 600 ("system 600"), according to certain embodiments. System 600 can include a 5G New Radio (NR) cellular network; other types of cellular networks, such as 4G LTE, 6G, 7G, etc. are also possible. System 600 can include: UE 610 (UE 610-1, UE 610-2, UE 610-3); base station 615; cellular network 620; radio units 625 ("RUs 625"); distributed units 627 ("DUs 627"); centralized unit 629 ("CU 629"); core 639, and orchestrator 638. FIG. 6A represents a component level view. In a virtualized open radio access network (O-RAN), because components can be implemented as software in the cloud, except for components that need to receive and transmit RF, the functionality of various components can be shifted among different servers, for which the hardware may be maintained by a separate (public) cloud-service provider, to accommodate where the functionality of such components is needed, as detailed in relation to FIG. 7.

UE 610 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a 5G interface, such as a 5G modem. Examples include sensor devices, Internet of Things (IoT) devices, manufacturing robots; unmanned aerial (or land-based) vehicles, network-connected vehicles, environmental sensors, etc. UE 610 may use RF to communicate with various base stations of cellular network 620. As illustrated, two base stations 615 (BS 615-1, 615-2) are illustrated. Real-world implementations of system 600 can include many (e.g., hundreds, thousands) of base stations, and many RUs, DUs, and CUs. BS 615 can include one or more antennas that allow RUs 625 to communicate wirelessly with UEs 610. RUs 625 can represent an edge of cellular network 620 where data is transitioned to wireless communication. The radio access technology (RAT) used by RU 625 may be 5G New Radio (NR), or some other RAT, such as 4G Long Term Evolution (LTE). The remainder of cellular network 620 may be based on an exclusive 5G architecture, a hybrid 4G/5G architecture, a 4G architecture, or some other cellular network architecture. Base station equipment 621 may include an RU (e.g., RU 625-1) and a DU (e.g., DU 627-1) located on site at the base station. In some embodiments, the DU may be physically remote from the RU. For instance, multiple DUs may be housed at a central location and connected to geographically distant (e.g., within a couple kilometers) RUs.

One or more RUs, such as RU 625-1, may communicate with DU 627-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 627-1, may communicate with CU 629. Collectively, RUs, DUs, and CUs create a gNodeB, which serves as the radio access network (RAN) of cellular network 620. CU 629 can communicate with core 639. The specific architecture of cellular network 620 can vary by embodiment. Edge cloud server systems outside of cellular network 620 may communicate, either directly, via the Internet, or via some other network, with components of cellular network 620. For example, DU 627-1 may be able to communicate with an edge cloud server system without routing data through CU 629 or core 639. Other DUs may or may not have this capability.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 6B:
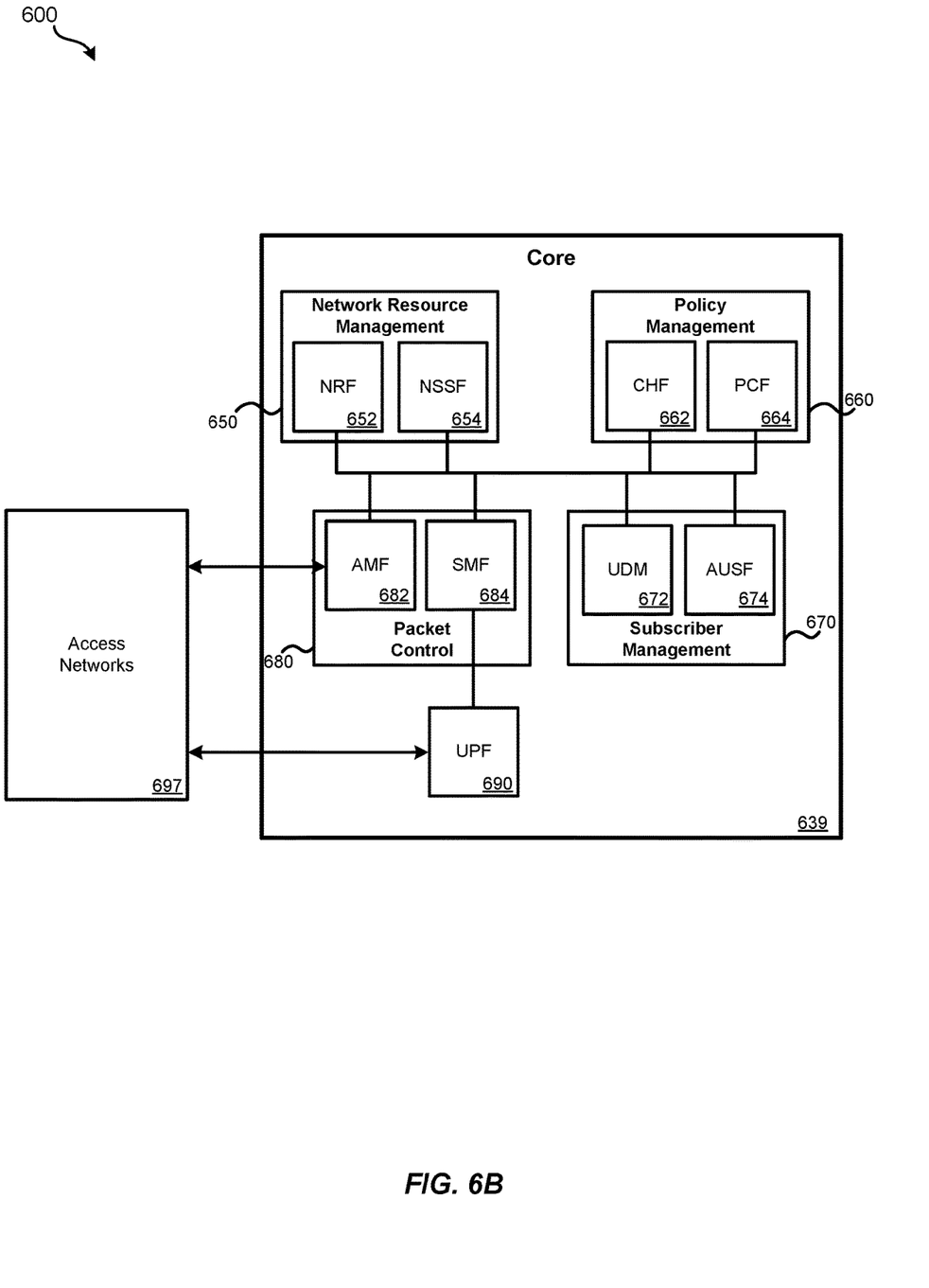
FIG. 6B illustrates an embodiment of a core of a cellular network system, according to certain embodiments.

Further detail regarding exemplary core 639 is provided in relation to FIG. 6B. Core 639, which can be physically distributed across data centers or located at a central national data center (NDC) as detailed in relation to FIG. 7, can perform various core functions of the cellular network. Core 639 can include: network resource management components 650; policy management components 660; subscriber management components 670; and packet control components 680. Individual components may communicate on a bus, thus allowing various components of core 639 to communicate with each other directly. Core 639 is simplified to show some key components. Implementations can involve additional other components.

Network resource management components 650 can include: Network Repository Function (NRF) 652 and Network Slice Selection Function (NSSF) 654. NRF 652 can allow 5G network functions (NFs) to register and discover each other via a standards-based application programming interface (API). NSSF 654 can be used by AMF 682 to assist with the selection of a network slice that will serve a particular UE.

Policy management components 660 can include: Charging Function (CHF) 662 and Policy Control Function (PCF) 664. CHF 662 allows charging services to be offered to authorized network functions. Converged online and offline charging can be supported. PCF 664 allows for policy control functions and the related 5G signaling interfaces to be supported.

Subscriber management components 670 can include: Unified Data Management (UDM) 672 and Authentication Server Function (AUSF) 674. UDM 672 can allow for generation of authentication vectors, user identification handling, NF registration management, and retrieval of UE individual subscription data for slice selection. AUSF 674 performs authentication with UE.

Packet control components 680 can include: Access and Mobility Management Function (AMF) 682 and Session Management Function (SMF) 684. AMF 682 can receive connection- and session-related information from UE and is responsible for handling connection and mobility management tasks. SMF 684 is responsible for interacting with the decoupled data plane, creating updating and removing Protocol Data Unit (PDU) sessions, and managing session context with the User Plane Function (UPF).

User plane function (UPF) 690 can be responsible for packet routing and forwarding, packet inspection, QoS handling, and external PDU sessions for interconnecting with a Data Network (DN) 695 (e.g., the Internet) or various access networks 697. Access networks 697 can include the RAN of cellular network 620 of FIG. 6A.

While FIGS. 6A and 6B illustrate various components of cellular network 620, it should be understood that other embodiments of cellular network 620 can vary the arrangement, communication paths, and specific components of cellular network 620. While RU 625 may include specialized radio access componentry to enable wireless communication with UE 610, other components of cellular network 620 may be implemented using either specialized hardware, specialized firmware, and/or specialized software executed on a general-purpose server system. In a virtualized arrangement, specialized software on general-purpose hardware may be used to perform the functions of components such as DU 627, CU 629, and core 639. Functionality of such components can be co-located or located at disparate physical server systems. For example, certain components of core 639 may be co-located with components of CU 629.

In a possible O-RAN implementation, DUs 627, CU 629, core 639, and/or orchestrator 638 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 600, cloud-based cellular network components 628 include CU 629, core 639, and orchestrator 638. In some embodiments, DUs 627 may be partially or fully added to cloud-based cellular network components 628. Such cloud-based cellular network components 628 may be executed as specialized software executed by underlying general-purpose computer servers. Cloud-based cellular network components 628 may be executed on a public third-party cloud-based computing platform or a cloud-based computing platform operated by the same entity that operates the RAN. A cloud-based computing platform may have the ability to devote additional hardware resources to cloud-based cellular network components 628 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits as needed for the cellular network 620 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU no longer exists, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 638. Orchestrator 638 can represent various software processes executed by underlying computer hardware. Orchestrator 638 can monitor cellular network 620 and determine the amount and location at which cellular network functions should be deployed to meet or attempt to meet service level agreements (SLAs) across slices of the cellular network.

Orchestrator 638 can allow for the instantiation of new cloud-based components of cellular network 620. As an example, to instantiate a new DU, orchestrator 638 can perform a pipeline of calling the DU code from a software repository incorporated as part of, or separate from, cellular network 620; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 620. Cellular network 620 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 625-1 and DU 627-1, a second set of network slices, which may only partially overlap or may be wholly different from the first set, may be reserved at RU 625-2 and DU 627-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 6A, UE 610 may be operating on one or more production slices of cellular network 620. As detailed later in this document, UE that function on a particular entity's local network may be assigned to a slice particular to the entity or a slice that provides a particular QoE for tasks to be performed by the entity's UE.

Components such as DUs 627, CU 629, orchestrator 638, and core 639 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method, comprising:
   receiving, by a user equipment (UE), input indicating an attempt to place an emergency call;
   communicating, by the UE, with a first cellular network to connect the emergency call;
   generating, by the UE, a first session initiation protocol (SIP) header, the SIP header generated at a regular interval and including first location data indicating a first location of the UE;
   transmitting, by the UE, the location data via a control plane function;
   transmitting, by the UE, the SIP header including the first location data via a user plane function of the first cellular network;
   while the emergency call is ongoing, disconnecting, by the UE, from the first cellular network and connecting to a second cellular network;
   communicating, by the UE, with the second cellular network to continue the emergency call;
   generating, by the UE, a second SIP header including second location data indicating a second location of the UE; and
   transmitting, by the UE, the second SIP header including the second location data via the user plane function of the first cellular network through the second cellular network.

2. The method of claim 1, further comprising:
   reconfiguring, by the UE, the UE to generate and transmit the first SIP header including the first location data in response to emergency calls.

3. The method of claim 2, further comprising:
   determining, by the UE, that the UE is originally configured to provide the first and second location data using control plane functions;
   based upon determining that the UE is configured to provide the first and second location data using control plane functions, accessing reconfiguration instructions; and
   executing, by the UE, the reconfiguration instructions.

4. The method of claim 2, further comprising:
   based upon determining that the UE is configured to provide the first and second location data using control plane functions, accessing reconfiguration instructions; and
   executing, by the UE, the reconfiguration instructions.

5. The method of claim 1, wherein the first cellular network is associated with a first provider, and the second cellular network is associated with a second provider.

6. The method of claim 1, wherein the first location data and the second location data are provided in a presence information data format location object (PIDF-LO) header.

7. The method of claim 1, wherein the first cellular network comprises a 5G network and the second cellular network comprises at least one of a 4G/LTE network and a 3G/2G network.

8. The method of claim 1, wherein the first cellular network comprises a first 5G network and the second cellular network comprises a second 5G network.

9. The method of claim 1, further comprising:
  determining, by the UE, the first and second location data by at least one of GPS services, provider location services, and triangulation techniques.

10. A user equipment (UE), comprising:
  one or more processors;
  a non-transitory computer-readable medium comprising instructions that, when executed by the one or more processors, cause the UE to perform operations to:
    receive, by the UE, input indicating an attempt to place an emergency call;
    communicate, by the UE, with a first cellular network to connect the emergency call;
    generate, by the UE, a first session initiation protocol (SIP) header, the SIP header generated at a regular interval and including first location data indicating a first location of the UE; and
    transmit, by the UE, the SIP header including the first location data via a user plane function of the first cellular network;
    transmit, by the UE, the location data via a control plane function;
    while the emergency call is ongoing, disconnect, by the UE, from the first cellular network and connect to a second cellular network;
    communicate, by the UE, with the second cellular network to continue the emergency call;
    generate, by the UE, a second SIP header including second location data indicating a second location of the UE; and
    transmit, by the UE, the second SIP header including the second location data via the user plane function of the first cellular network through the second cellular network.

11. The UE of claim 10, wherein the UE comprises one or more radios configured to communicate via a 5G network.

12. The UE of claim 10, wherein the first cellular network comprises a WiFi network and the second cellular network comprises at least one of a 5G network, a 4G/LTE network and a 3G/2G network.

13. The UE of claim 10, wherein the SIP header comprises at least one of an SIP update and a SIP options.

14. The UE of claim 10, wherein the first cellular network is associated with a first provider, and the second cellular network is associated with a second provider.

15. The UE of claim 10, wherein the UE is configured to support positioning methods comprising mobile-originated location requests, assisted GPS, enhanced cell ID, WiFi round-trip time (WiFi-RTT), downlink time difference of arrival (DL-TDOA), uplink time difference of arrival (UL-TDOA), angle of arrival, and angle of departure.

16. The UE of claim 10, wherein the first location data is comprised in a P-Access-Network-Info (PANI) header, and the first SIP header comprises the PANI header.

17. The UE of claim 10, wherein the first location data is comprised in a presence information data format location object (PIDF-LO) header.

18. A method, comprising:
  determining, by the UE, that a UE is originally configured to provide first and second location data using control plane functions;
  based upon determining that the UE is configured to provide the first and second location data using control plane functions:
  accessing reconfiguration instructions;
  executing, by the UE, the reconfiguration instructions; and
  reconfiguring, by the UE, the UE to generate and transmit the first SIP header including the first location data in response to emergency calls;
  receiving, by a user equipment (UE), input indicating an attempt to place an emergency call;
  communicating, by the UE, with a first cellular network to connect the emergency call;
  generating, by the UE, a first session initiation protocol (SIP) header, the SIP header including first location data indicating a first location of the UE; and
  transmitting, by the UE, the SIP header including the first location data via a user plane function of the first cellular network;
  while the emergency call is ongoing, disconnecting, by the UE, from the first cellular network and connecting to a second cellular network;
  communicating, by the UE, with the second cellular network to continue the emergency call;
  generating, by the UE, a second SIP header including second location data indicating a second location of the UE; and
  transmitting, by the UE, the second SIP header including the second location data via the user plane function of the first cellular network through the second cellular network.

19. The method of claim 18, further comprising:
  reconfiguring, by the UE, the UE to generate and transmit the first SIP header including the first location data in response to emergency calls.

* * * * *